UNITED STATES PATENT OFFICE.

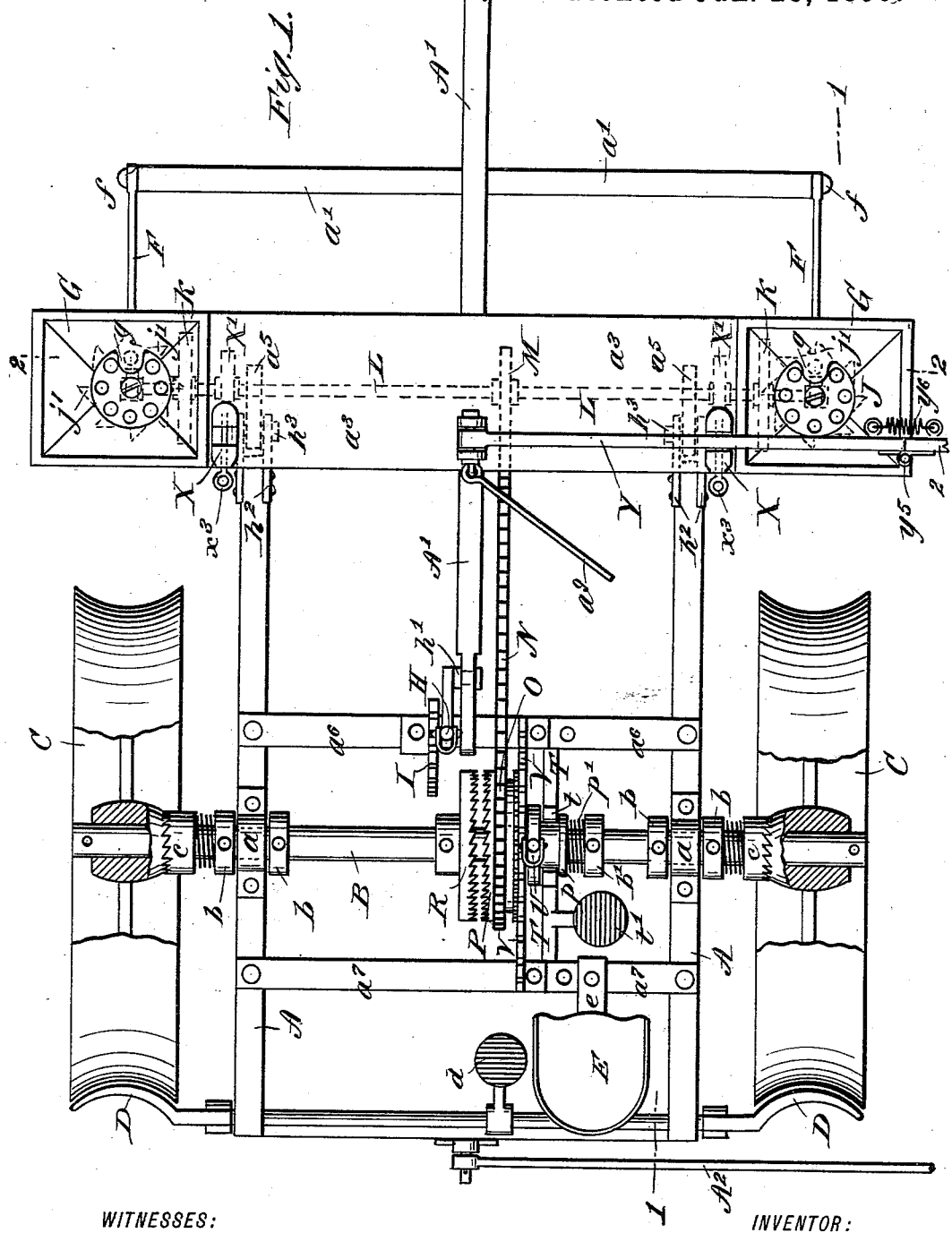

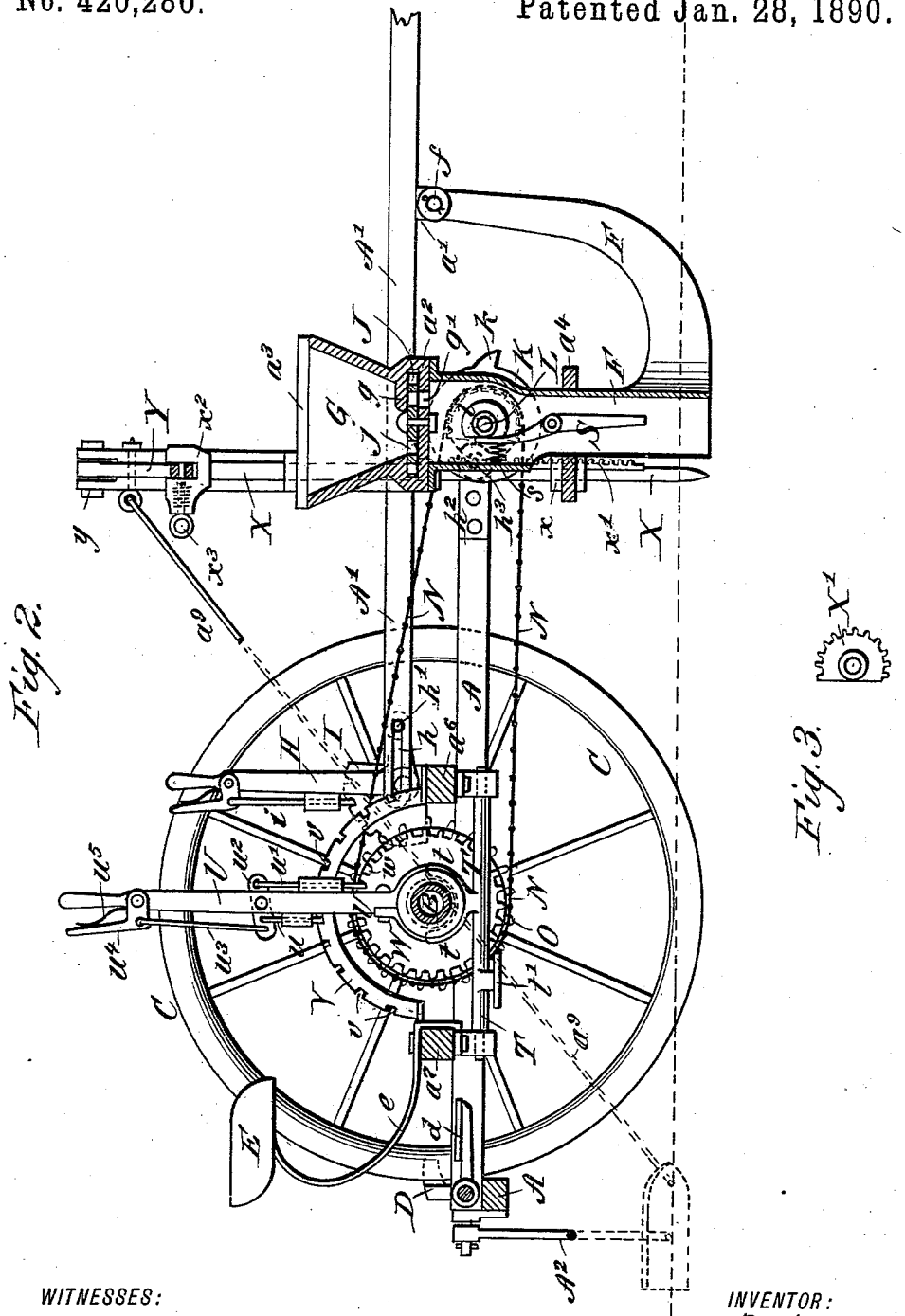

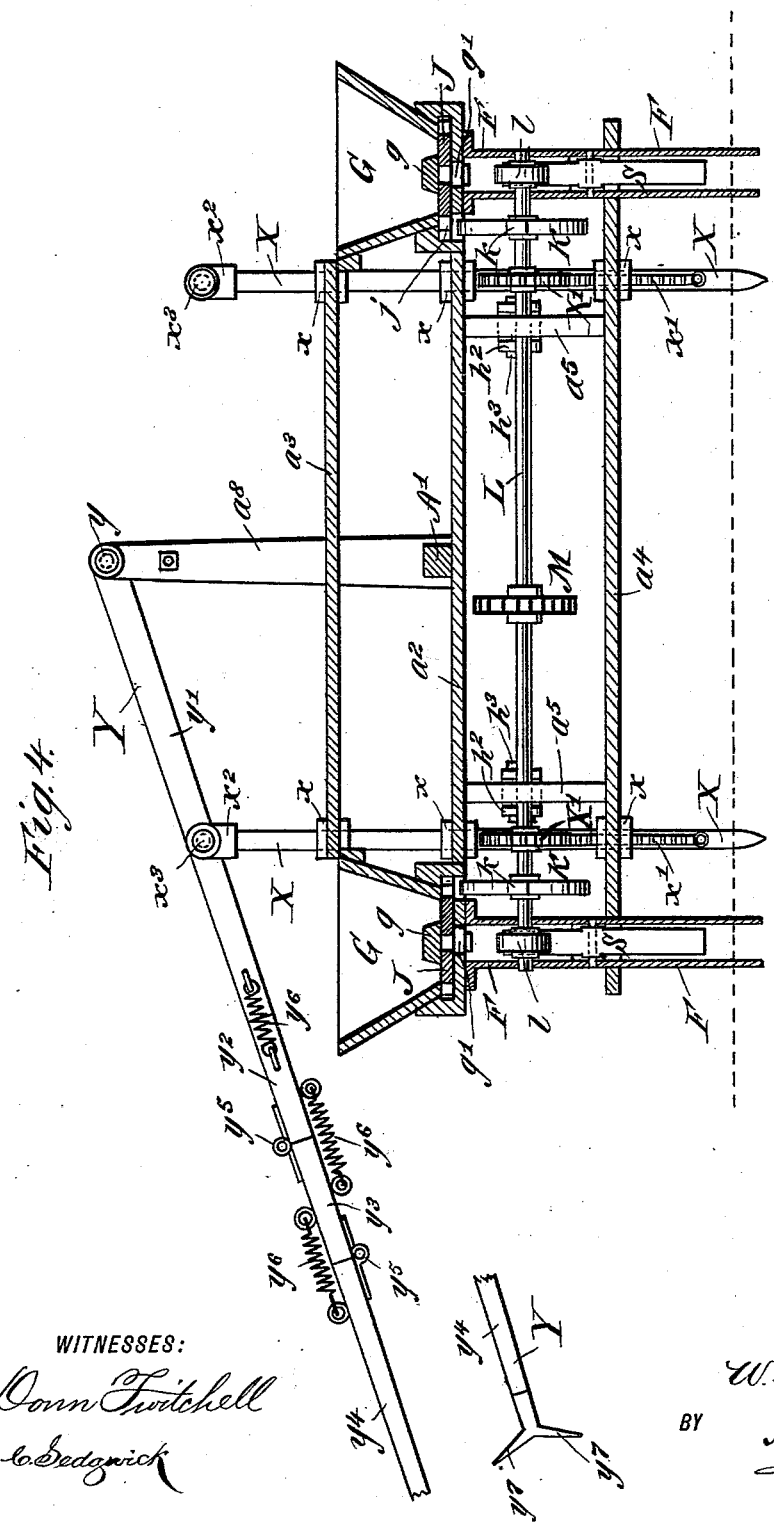

WILLIAM R. MORSE, OF CHICAGO, ILLINOIS.

CHECK-ROW PLANTER.

SPECIFICATION forming part of Letters Patent No. 420,280, dated January 28, 1890.

Application filed November 28, 1888. Serial No. 292,045. (No model.)

*To all whom it may concern:*

Be it known that I, WILLIAM R. MORSE, of Chicago, in the county of Cook and State of Illinois, have invented a new and Improved Check-Row Planter, of which the following is a full, clear, and exact description.

My invention relates to a check-row planter, and has for its object to provide a simple, durable, and efficient machine of this character the planting mechanism of which is capable of quick and easy adjustment to assure planting in accurate check-row, and to also provide for marking the ground oftener than is common with machines of this class, as a better guide to the attendant to enable him to control more closely the accuracy of the planting.

The invention consists in certain novel features of construction and combinations of parts of the planter, all as hereinafter described and claimed.

Reference is to be had to the accompanying drawings, forming a part of this specification, in which similar letters of reference indicate corresponding parts in all the figures.

Figure 1 is a plan view of my improved check-row planter with parts broken away and in section. Fig. 2 is a longitudinal vertical sectional elevation of the machine, taken on the irregular line 1 1 in Fig. 1. Fig. 3 is a side elevation of one of the marker-operating gears; and Fig. 4 is a transverse vertical section of the planter, taken on the line 2 2 in Fig. 1, the lateral marker being partly broken away.

The machine-frame A is supported by boxes or bearings *a a* from an axle B and wheels C C, which are placed loosely on the axle and are engaged at their hubs by spring-pressed clutches *c c*, which are fixed to the axle and allow either of the wheels to outrun the other, or allow backing of the machine at will without effect on the seed-dropping mechanism. Ordinary scrapers D D, held to a shaft journaled on the frame, may be pressed to the faces or peripheries of the wheels to clear them of earth by the operation of the foot-lever or treadle *d* of the scraper-shaft by the attendant or driver on a seat E, held by a spring-standard *e* to the frame. Pairs of collars *b b* on the axle B hold the frame and wheels in proper relative positions.

Ordinary shoes or runners F F are pivoted at *f* at their upper forward ends to the opposite ends of a front cross-bar *a'*, which is fixed to the draft-tongue A', which extends rearward and is fixed to a cross bar or beam $a^2$, to which the tops of the trunks of the runners are also fixed, and which supports the seed-boxes G G, one at each side of the machine. The rear end of the tongue is horizontally slotted at *h* to receive a pin *h'*, which is on the extremity of the short arm of an elbow-lever H, which is fulcrumed at its angle to suitable bearings on a cross-bar $a^6$ of the frame A and next a catch-plate I, with the edge notches of which a spring-pressed latch-bar *i*, held to the lever, is adapted to engage for locking the lever at any required adjustment. The cross-bar $a^2$ stays the tops of the trunks of the two runners F F, and also supports the seed-boxes, which at their tops are connected and stayed by another cross bar or beam $a^3$, and a third cross-bar $a^4$ is also fastened to the two runners and forms a lower stay thereto. The middle and lower cross-bars $a^2$ $a^4$ are connected and supported and stayed apart by a pair of upright braces $a^5$ $a^5$, to which the forward ends of the opposite side bars of the frame are pivotally connected, preferably by pairs of metal plates $h^3$ $h^2$, which are fixed to the frame and project forward at opposite sides of the braces, to which they are held by a pivot bolt or pin $h^3$. With this construction it is obvious that as the tongue A' and the seed-boxes and runners and their supporting-frame $a^2$ $a^3$ $a^4$ $a^5$ are all held to each other they will move together on the pivot-bolts $h^3$, which connect the main frame with the seed-box and runner-frame; hence the runners F F may at any time be lifted clear of the ground when the machine is on the road or out of use, or the runners may be set to work deeper or shallower in the soil by operating the lever H and locking its catch *i* in the plate I on the main frame. The cross-bars $a^2$ $a^3$ $a^4$ of the seed-box and runner-frame support and guide the vertically-movable ground-markers of the machine, as hereinafter more fully explained.

The seed is dropped from each of the boxes G by means of a horizontally-rotating wheel J, which is journaled to the cross-bar $a^2$, which forms the hopper-bottom, and between said cross-bar and a plate or flange $g$, which projects from the side wall of the hopper or a ring fixed thereto and always overlies and closes that one of the seed-holes $j$ of the wheel J which as the wheel turns passes over a hole $g'$ in the cross-bar $a^2$ or the hopper-bottom. It is obvious that the seed in the boxes will fall by gravity into the holes $j$ of the wheel J, and that the plate $g$ acts as a cut-off to allow only so much seed as fills one of the holes $j$ to fall through the hole $g'$ into the runner and thence into the furrow made in the ground by the runner, and the dropped seed will be automatically covered by the concaved face or rim of the main wheel C following the runner. The seed-wheel J is provided with peripheral teeth or lugs $j'$, which are successively engaged by a tooth or lug $k$ on the periphery of a wheel K, which is fixed to a transverse shaft L, which is journaled under the seed-boxes and to the shoes F, and carries a sprocket-wheel M, from which a driving-chain N runs to a sprocket-wheel O, which is fast to a half-clutch P, placed loosely on the axle B and adapted for engagement with a half-clutch R, which is fast to the axle, and when the clutches are engaged drives the shaft L by the chain and sprocket-wheels to operate the seed-dropping wheels J of both seed-boxes simultaneously. The shaft L also carries within the trunk or tube of each of the furrow-opening shoes F a cam $l$, formed as a wheel with a portion of one side cut away, and below this cam in the shoe is fulcrumed a lever-plate S, the lower part of which is adapted to close the front of the runner-tube to confine therein each hill of seed received from or through the seed-wheel J, while the upper end of the lever-plate is thrown or held backward by the continuous curved face or high part of the cam-wheel; but as the cam rotates and its cut-away or low part or face is presented to the lever S a spring $s$, which acts between the lever and the shoe-wall and always holds the lever to the cam, instantly throws the lower end of the lever backward to open a passage through the shoe, for the last hill of seed dropped from the superposed seed-box to the ground, whereupon the cam again closes the lever S to retain the next hill of seed dropped from the box until the lever is next opened by the spring, when it is allowed to do so by the rotation of the cam. A spring $p'$, placed on the axle between the end of the elongated hub $p$ of the clutch P and a collar $b'$ on the axle, normally engages this clutch with the clutch R, and the clutches may be disengaged at any time by the depression of a treadle $t'$, which projects laterally from a rock-shaft T in reach of the foot of the driver on the seat E, said shaft being journaled in boxes held to the frame cross-bars $a^6$ $a^7$ and having an upwardly-projecting fork $t$, which engages an annular groove in the hub of the adjustable clutch.

A lever U, which is fixed at its inner end to the clutch P and projects within reach of the driver, is provided with a double latch, consisting of bars $u$ $u'$, fitted in suitable guides on the lever and connected to opposite ends of a short transverse plate $u^2$, which is fulcrumed at its center to the lever. The end of the plate $u^2$ next the latch-bar $u$ is connected by a link $u^3$ with an elbow-lever handle $u^4$, which is pivoted to the main lever U, and is normally pressed outward at its top by a spring $u^5$, which thus holds the latch-bar $u$ normally engaged with any one of a series of notches $v$ in an arched catch-plate V, which is bolted to the main frame, and also normally holds the latch-bar $u'$ out of peripheral teeth or notches $w$ on a wheel W, which is fixed to the loose clutch P. With this construction it is obvious that when the lever-handle $u^4$ is pressed inward to disengage the latch-bolt $u$ from the catch-plate V and engage the latch-bolt $u'$ with the notched clutch-wheel W the driver, after having pressed on the treadle $t'$ to disengage the clutch P from the one R, may, by operating the lever U, turn the clutch P, and with it the sprocket-wheel O, for shifting the driving-chain N of the seed-dropping mechanism either one way or the other to cause the seed to be dropped to the ground earlier or later, as may be necessary, to assure planting of the seed in accurate check-row. Usually I will employ the lever U only to throw the drop ahead or make the machine drop quicker, as the drop may be made slower by simply disconnecting the clutches P R and running the machine forward on the wheels C until accurate alignment of the hills of seed is secured. This clutch and lever and latch mechanism thus permits quick and easy adjustment of the seed-dropping mechanism to assure planting in accurate check-row.

In addition to the ordinary seed-runner marker $A^2$, which is pivoted to the rear end of the machine-frame, so as to be thrown over to either side to run in a groove last made in the ground by it as a guide to the driver, I employ two additional markers and a pointer, which are made and operated as next described.

The two markers X X are made alike and are arranged one at or near each of the seed-boxes G, and both are preferably made as a bar or shaft with a lower pointed end and fitted for vertical movement within anti-friction boxes or bearings $x$, which are preferably bushed with rollers and are held one to each of the three cross-bars $a^2$ $a^3$ $a^4$ of the seed-box and runner-frame. Each of the markers is provided with a rack $x'$, which is adapted for engagement by a mutilated or semicircular gear-wheel $X'$, fixed to the seeder-shaft L, and whereby as each hill of seed is dropped from the seed-boxes the cut-away parts of the gears $X'$ will be presented to the marker-racks $x'$ and will allow the markers to fall to the ground and leave distinct marks therein, which may be sighted with other like marks previously made by them across the field to determine the accuracy of the planting. After each fall of the markers they will be almost instantly raised again by the meshing of the teeth of the gears X' with the marker-racks and ready to fall again as the next hills of seed are dropped from the seed-boxes.

The pointer or third auxiliary marker Y is pivoted at its inner end by a pin or bolt $y$ to the forked or laterally-slotted upper end of a standard $a^8$, which is supported on the seed-box and runner-frame, and to which the stay-rod $a^9$ of the ordinary marker $A^2$ is hooked or otherwise attached. This construction allows the pointer to be swung over to either side of the machine and to be entered into a lateral slot made in the head-piece $x^2$ of either of the markers X X, and the pointer may be held to either marker by a horizontal spring-pressed pin $x^3$, fitted in its head-piece and adapted to enter a slot in the pointer. I make the pointer bar or staff in four pieces $y'$ $y^2$ $y^3$ $y^4$, which are hinged together at adjacent ends, so as to form a straight bar or rod capable of flexing upward and rearward when set to project at either side of the machine. Across the three joints of the pointer, and at its face opposite the hinges $y^5$ of the joints, are arranged springs $y^6$, the opposite ends of which are connected to eyes or staples set at opposite sides of the joints of the pointer-sections. One of the hinges $y^5$ is placed at the top of the pointer, and another is placed at the opposite or lower side thereof, and these two hinges allow the pointer to bend upward should one of its points $y^7$ strike an obstruction—such as a stone or root—when the pointer is adjusted either to the right or left side of the machine. The third hinge, or, as shown, the one nearest the inner end of the pointer, is placed at its rear face, and this spring allows the pointer to bend or flex rearward at its outer end should it strike an obstruction at either side of the machine as it moves over the field. The springs $y^6$ have sufficient tension to normally hold the point or rod straight and to straighten it again after each flexing of it, either vertically or horizontally, as it passes by an obstruction in the field; hence the pointer will escape injury by contact with obstacles and will remain sufficiently rigid to be operated by the markers X as an auxiliary guide or gage whereby to test the accuracy of the planting in true check-row. It is obvious that to whichever of the markers X the pointer Y may be adjusted the pointer will rise and fall with it, and the pointer-head $y^7$ may fall quite to the ground, or preferably stop a little above the ground and over the marks made by one of the markers X at the last passage of the machine over the field. By noticing the position of the pointer-head at each downstroke of the pointer relatively to the imprints made in the ground by the markers an effective auxiliary gage to determine the accuracy of the planting is provided.

By substituting complete gear or sprocket wheels for the one-toothed wheels K the seed-wheels J will be operated continuously to cause the machine to plant in drills, and by substituting one seed-wheel for another having larger or smaller seed holes or pockets the machine will plant more or less seed in hills or drills, as will readily be understood.

Having thus fully described my invention, what I claim as new, and desire to secure by Letters Patent, is—

1. The combination of a frame, wheels supporting it, a clutch R, fixed to the wheel-axle, a clutch P, loose on the axle, a sprocket-wheel O on this clutch, a shaft L, actuating the seed-dropping devices, a wheel M on said shaft, a belt N, connecting said wheels M O, and a shipper consisting of a rock-shaft T, journaled on the frame and provided with a fork engaging the movable clutch and with a treadle $t'$, substantially as herein set forth.

2. The combination of a frame, wheels supporting it, a clutch R, fixed to the wheel-axle, a clutch P, loose on the axle, a sprocket-wheel O on the clutch, a shaft L, actuating the seed-dropping devices, a wheel M on said shaft, a belt N, connecting said wheels M O, a shipper comprising a rock-shaft journaled on the frame and provided with a fork engaging the movable clutch and with a treadle $t'$, and a lever U, having latches $u\,u'$, one normally engaging a catch-plate on the frame and the other adapted to engage notches at the axle sprocket-wheel, substantially as herein set forth.

3. The combination, with the wheels, axle, and fixed and loose clutches thereon and the loose clutch geared with the seed-dropping devices, substantially as specified, of peripheral notches $w$ on the loose clutch, or a wheel fixed thereto, a notched catch-plate V on the machine-frame, and a lever U, fulcrumed at the loose clutch and provided with a pivoted plate $u^2$, and latch-bolts $u\,u'$, connected thereto and adapted, respectively, to engage the plate V and notches $w$, substantially as herein set forth.

4. In a seed-planter, the combination, with the frame, seed-boxes thereon, and runners receiving the seed from the boxes, of a shaft L, seed-retaining lever-plates S in the boxes, cams $l$ on the shaft L, which open the lever-plates to drop the seed, and mechanism, substantially as specified, actuating the shaft L from the planter-wheels, substantially as herein set forth.

5. In a seed-planter, the combination, with the shaft actuating the seed-dropping mechanism, of vertically-movable markers provided with racks and mutilated gears fitted on the seeder-shaft and adapted to engage said racks, substantially as described, for the purposes set forth.

6. In a seed-planter, the combination, with the shaft actuating the seed-dropping mechanism, lever-plates in the seed-delivery tubes, and cams on the shaft actuating said plates to drop the seed, substantially as specified, of vertically-movable markers fitted in the frame and provided with racks and mutilated gears on the seeder-mechanism shaft and engaging the racks of the markers to lift and let them fall simultaneously with the dropping of the hills of seed, substantially as herein set forth.

7. A seed-planter provided with an auxiliary marker pivoted at its inner end to the frame, so as to be swung to either side of the machine, and made in four sections hinged together to allow it to flex vertically and horizontally when swung on either side of the machine, substantially as described.

8. A seed-planter provided with an auxiliary marker pivoted at its inner end to adapt it to be swung to either side of the machine and made in four sections hinged together to allow it to flex vertically and horizontally when swung to either side of the machine, the said sections being held in alignment by means of springs, substantially as described.

9. In a seed-planter, the combination, with vertically-movable markers fitted in the machine-frame and actuated from the seed-dropping mechanism, of a laterally-projecting pointer or auxiliary marker adapted to the head of the vertically-movable marker for operation thereby and therewith, substantially as herein set forth.

10. In a seed-planter, the combination, with a frame, two seed-boxes thereon, and a vertically-movable marker next each seed-box and actuated from the seeder-shaft, of a laterally-projecting pointer or auxiliary marker pivoted at its inner end to a support on the frame and adapted to be swung over to either of the vertically-movable markers for operation thereby at either side of the machine, substantially as herein set forth.

11. In a seed-planter, the combination, with vertically-movable markers, of an auxiliary marker pivoted at its inner end and adapted to be connected to one of the vertical markers, the said auxiliary marker being made in sections hinged together and held in alignment by springs, substantially as herein shown and described.

WILLIAM R. MORSE.

Witnesses:
WARREN A. ALDEN,
A. L. FORTENBAUGH.